United States Patent
Johnsen

(10) Patent No.: US 7,811,466 B2
(45) Date of Patent: Oct. 12, 2010

(54) STABILIZING MEMBRANE FOR WATER AND NUTRIENT

(76) Inventor: Torfinn Johnsen, Luragaten 25B, Sandnes (NO) 4307

( * ) Notice: Subject to any disclaimer, the term of this patent is extended or adjusted under 35 U.S.C. 154(b) by 392 days.

(21) Appl. No.: 11/574,981

(22) PCT Filed: Sep. 8, 2005

(86) PCT No.: PCT/NO2005/000327

§ 371 (c)(1), (2), (4) Date: Jul. 23, 2007

(87) PCT Pub. No.: WO2006/031122

PCT Pub. Date: Mar. 23, 2006

(65) Prior Publication Data

US 2009/0044581 A1 Feb. 19, 2009

(30) Foreign Application Priority Data

Sep. 13, 2004 (NO) .................................. 20043827

(51) Int. Cl.
C05F 11/00 (2006.01)
C09K 17/40 (2006.01)

(52) U.S. Cl. ..................... 252/88.1; 47/58.1 SC; 71/18; 71/23; 71/903; 405/264

(58) Field of Classification Search ........................ 71/3, 71/6, 11, 23, 18, 903; 252/88.1; 47/58.1 SC; 405/264

See application file for complete search history.

(56) References Cited

U.S. PATENT DOCUMENTS

| 103,085 | A | | 5/1870 | Ruggles |
| 118,987 | A | | 9/1871 | Treat |
| 950,455 | A | | 2/1910 | McVitty |
| 4,125,392 | A | | 11/1978 | Primo |
| 5,328,683 | A | * | 7/1994 | Harashima ................. 424/63 |
| 6,029,395 | A | * | 2/2000 | Morgan ......................... 47/9 |
| 6,048,377 | A | | 4/2000 | Kviesitis |
| 6,503,287 | B1 | | 1/2003 | Schraven |
| 6,511,258 | B1 | * | 1/2003 | Johnsen ....................... 404/75 |
| 7,271,128 | B2 | * | 9/2007 | Shetty ......................... 504/117 |

| 2003/0097864 | A1 | | 5/2003 | Montes |
| 2005/0080036 | A1 | * | 4/2005 | Gaserod et al. ............... 514/54 |

FOREIGN PATENT DOCUMENTS

| CN | 1229778 | 9/1990 |
| EP | 0177226 | 9/1986 |
| GB | 2154225 | 9/1985 |
| JP | 09124384 | 5/1997 |
| NO | 20031167 | 3/2003 |
| WO | 0170012 | 9/2001 |
| WO | 2004067679 | 8/2004 |
| WO | 2004080156 | 9/2004 |

OTHER PUBLICATIONS

Office Action from Norwegian Patent Office of Oct. 15, 2008, rejecting claims over previously cited art.
Opinion of the appeal board of Norweigian Patent Office, dated Jan. 7, 2010, together with english language summary (The opinion cites references D1-D10, all of which have been previously cited in an IDS in this matter).

* cited by examiner

Primary Examiner—Wayne Langel
Assistant Examiner—Syed Iqbal
(74) Attorney, Agent, or Firm—Christian D. Abel

(57) ABSTRACT

This invention relates to a preparation and a method for reducing the consumption of water in agriculture and other activities in which plants are cultivated, and which at the same time helps to reduce the seepage of nutrient-rich, fertilizer-saturated water into the ground water. More particularly, the invention relates to an electronegative, antioxidizing powder mixture which, upon application to an upper layer of soil, is capable of forming a biologically degradable membrane in the upper layer of soil, preferably comprising the surface of the soil and a biologically active zone for root and plant formation, wherein the membrane has a combined effect in that it increases the retention time of water and nutrients in the root zone, has an antioxidizing effect on the environment in order to combat ozone and other free radical induced damage to the vegetation, and regulates the albedo of the top soil layer so that the temperature in the root zone is held within the temperature at which the plants thrive. This is obtained by a powder mixture comprising a water-soluble, dried and ground organic raw material from marine brown algae with at least one added pigment, and that the powder mixture is exposed to an E-field of negative polarity so that the material at least is saturated with electrons.

19 Claims, No Drawings

STABILIZING MEMBRANE FOR WATER AND NUTRIENT

TECHNICAL FIELD

This invention relates to a preparation and a method for reducing the consumption of water in agriculture and other activities in which plants are cultivated, and which at the same time helps to reduce the seepage of nutrient-rich, fertiliser-saturated water into the ground water. More specifically, the invention relates to an electronegative and antioxidising powder mixture which, upon application to an upper layer of soil, is able to form a biologically degradable membrane in the upper layer of soil, preferably comprising the surface of the soil and a biologically active zone for root and plant formation, wherein the membrane has a combined effect in that it increases retention time of water and nutrients in the root zone, has an antioxidising effect on the environment in order to combat ozone and other free radical induced damage to vegetation, and regulates the albedo of the top soil layer so that the temperature in the root zone is maintained within the temperature at which the plants thrive.

This invention is a further development of the invention presented in Norwegian Application NO 20031167, which has been filed in the international phase as PCT/NO04/00071. Both applications are incorporated herein by reference in their entirety.

BACKGROUND

The earth's population has increased from about three billion in 1960 to about 6.2 billion in 2002, and is expected to increase to a peak of about 11 billion in around 2050 before slowly decreasing, i.e., in just 90 years the population of the world will have almost quadrupled. The population explosion has represented, and still represents, a major challenge as regards both increasing the access to clean drinking water for direct consumption and food production and meeting the ever more rapidly growing need for more food.

To date, the problem of the increasing need for food has been solved by a change-over from traditional agriculture to modern knowledge-based agriculture with extensive use of mechanical working power and scientifically based knowledge of how to cultivate land with maximum efficiency. Important factors are the use of artificial irrigation, synthetic fertilisers, chemical weed and pest control, and new gene-modified plants which give greater yields and are more resistant to pests. One example of the significance of modern agriculture is that in 1940 the USA produced 56 million tonnes of maize on 31 million hectares whilst in 1999 it produced 240 million tonnes of maize on 29 million hectares, i.e., a quadrupling of yield per area unit of cultivated land. In 1998 the world's food production was 5,034 million tonnes (source: FAOSTAT, 1999), of which 99% comes from agriculture whilst fishing and hunting accounts for 1%. Had this amount of food been evenly distributed, it would have been possible to give 900 million people more than today's population a healthy diet of 2,350 kcal per day. There is just sufficient food in the world today, and the increase in food production has taken place without any appreciable increase in the total cultivated area since 1960. But the battle is far from won. The world population is expected to double yet again during the next 50 years, which means that we must manage to almost double today's agricultural productivity if we are to avoid extensive famine in the world.

However, there are problems associated with modern agriculture. One serious problem that may be a major obstacle to obtaining the necessary doubling of production capacity is that access to fresh water is in the process of becoming scarce in large parts of the world. According to the World Meteorological Organization, 70% of the world's freshwater uptake in 1997 was used for irrigation of agricultural areas. And this amount of water was used by just 17% of the world's agricultural areas, which alone account for 40% of the total food production this year. In 1997 the United Nations estimated that one third of the world population lives in areas with a moderate to high stress level on the water supply, and it is expected that as much as two thirds of the world population may experience the same in 2025. This problem is aggravated in that today water is often used inappropriately as it is supplied to agricultural areas without any form of control of runoff and evaporation factors. Some studies have shown that plants in dry, hot areas make use of as little as 2% of the water that is supplied to the soil.

It is therefore obvious that optimal use of freshwater resources will be a very important factor in achieving productivity goals in tomorrow's agriculture, and that we need a method and means which can radically increase the level of utilisation of water supplied to agricultural areas.

PRIOR ART

A number of different films and coatings are known for use in agriculture as a cover for surfaces such as fields and plant beds in order to obtain specific conditions for plant growth. Best known are films of different types that are laid out on fields. Examples of such techniques are known from, for example, U.S. Pat. Nos. 6,029,395, 5,729,929, 4,794,726 and 377,147. Solutions that are to be laid on top of the ground cannot, for obvious reasons, have any appreciable effect on the soil's water retention properties and are thus of little relevance to this invention.

From an earlier Norwegian application by the same inventor as this application, NO 20003587, a membrane-forming powder mixture is known that is dissolved in a solvent and then applied to the soil in liquid state in order to harden into a membrane in an upper layer of the soil. The powder mixture should comprise:

a binder of proteins;
a fibrous material such as cellulose, paper fibres, plant fibres etc.;
a solvent such as water or sap;
at least one dark and one light pigment;
an animal or vegetable oil; and
an ammonium compound.

The mixture may also advantageously have a foaming agent and/or a pH regulator added thereto, and the mixture should preferably be made of raw materials that are organic waste so that it is very inexpensive, completely biodegradable and helps to solve a waste problem from other industries. In addition, the membrane per se will be nutrition for the plants. The invention according to NO 20003587 has to a large extent the same object as the present invention, but the membrane is built up of different substances and, despite a more complex composition, can by no means exhibit the same properties as this invention, both as regards efficiency and areas of use.

TILCO Biochemie GmbH has marketed alginate-based products for use as soil enhancers. According to their home page: http://www.tilco-biochemie.de/produkte.htm, they have since the 1960s extracted alginic acid from the cell walls of marine brown algae and converted it into low-molecular alginates that are used in a number of unspecified granulate products. These granulates are said to be effective agents in the soil for binding nutrients and water so that plants can make use of them.

OBJECT OF THE INVENTION

The main object of this invention is to provide a highly effective preparation capable of radically changing the soil's ability to retain water and nutrient salts and of having an antioxidising effect on the surroundings, and which is capable of altering the soil's albedo.

Another object of the invention is to provide a preparation that can increase crops in such a simple and inexpensive manner that farmers in the poorest areas of the world will be able to afford to use it.

Yet another object is to provide a preparation that in an efficient and inexpensive manner converts hot, barren dry areas into fertile land.

BRIEF DESCRIPTION OF THE INVENTION

The objects of the invention are achieved by that set forth in the following description of the invention and the attached patent claims.

This invention is a further development of the membrane presented in Norwegian Patent Application NO 20031167, which has been filed in the international phase as PCT/NO04/00071. Both applications are owned by the same applicant as this application, and are incorporated herein by reference in their entirety. More specifically, this invention is a membrane-forming powder mixture of a simpler composition than the membrane-forming powder presented in the reference applications, and which despite its simple composition exhibits a surprisingly potent and long-acting effect as a growth-promoting agent for plants. The combination of the water and nutrient retaining, antioxidising and temperature-regulating properties renders the powder mixture according to this invention highly capable of converting dry land areas such as desert areas into fertile agricultural areas. However, the invention may of course also be adapted so as to be capable of enhancing the development of plants in virtually all other climatic conditions by adjusting the ratio between the types of alginate and pigment used.

The present invention is based on the recognition of the fact that alginate produced by marine brown algae is highly suitable for forming a gel with excellent long-term water-binding properties in a soil and that alginate per se has an antioxidising effect on ozone and other free radicals in a soil when the carboxylic acids in the alginate monomers are dissociated. If these properties are combined with the albedo-regulating effect of pigments, a powder can be formed which, when dissolved in water, will form a gel which upon application to a soil will soak some way down and form an underlying water and nutrient retaining membrane whilst the pigments are held back and, together with some of the alginate compounds, form an albedo-regulating pigment layer on the surface of the soil. It is thus possible to solve two serious problems for plant growth in hot, dry areas: that the temperature of the top soil layer is higher than the temperature at which the plants thrive; and that dry soil as a rule has inadequate water-binding capacity so that water supplied runs down into the soil very quickly and becomes inaccessible to the plant roots.

A very important feature of the membrane according to the invention is that it should have a strong and long-acting antioxidising effect on ozone and other free radicals in and just above the top soil layer. This feature is highly important because the inventor has discovered that ozone damage to vegetation is not primarily due to air-transported ozone, as conventional theory suggests, but because ozone is formed locally in moist soil or sand when it is illuminated with UV-B radiation (sunlight contains this UV fraction). The optimal solution to the problems of ozone damage to vegetation is therefore not to impregnate the plants, as is the focus of many conventional solutions, because parts of the roots and newly developed parts of the plants (after the impregnation) will also be exposed to the ozone. The solution is therefore to stop ozone production in the ground. This is particularly important for hot, dry areas as these have greatest exposure to sunlight and a correspondingly strong production of near-ground ozone. The inventor has discovered that the ozone-destroying effect of the membrane according to the invention can be enhanced and made more long-acting by at least saturating the powder mixture with electrons before it is dissolved in water to form a gel. Advantageously, ionisers may also be used that are sufficiently strong to oversaturate the powder mixture with electrons, i.e., give the powder an excess of electrons. This feature has been confirmed in field studies with the membrane according to the reference applications, NO 20031167 and PCT/NO4/00071, in which ionisation of the membrane resulted in both a more long-acting and a stronger antioxidising effect: the treated membrane (formed of an E-field treated powder mixture) gave an $O_3$ concentration of between 2-8 ppb in the first five days and then a slowly increasing tendency of about 1 ppb per day, whilst the untreated membrane (made of untreated powder) showed 12-23 ppb in the first five days and then a rapidly increasing tendency of about 4 ppb per day. The $O_3$ concentration in the air was about 40 ppb. The membrane according to this invention is, in chemical terms, somewhat similar to the membrane according to the reference applications, so that it is expected that the membrane according to this invention will derive a similar benefit from the ionisation process/electron saturation.

Another advantage of saturating the powder mixture according to the invention with electrons, i.e., making the resulting surface of the membrane electronegative, is that this will help to increase the nutrient uptake of the plants. By "electronegative" is meant that the membrane is saturated with excess electrons and thus has maximum potential difference in relation to gas molecules, airborne particles etc. in the atmosphere. Tests carried out by the inventor show that pollen grains and other organic airborne particles have in the main a positive electrophysical character (deficiency of electrons), and thus are drawn to surfaces having excess charges. This finding is in conformity with observations of the floating pattern of visible seeds such as dandelion seeds, where it is clearly seen that they have a tendency to float above electropositive surfaces such as asphalt, concrete, densely planted lawn surfaces etc. in order to then fall to the earth on surfaces of electrically neutral and negative character. Thus, by ensuring that the membrane according to the invention is negatively charged, a membrane will be obtained that will actively counter the tendency of the ground to be electropositive. This means that a soil coated with a membrane according to the invention will, to a greater extent than uncoated soil, attract particles such as dust, pollen and water vapour from the air just above the ground, and in this way the soil will actively be supplied with nutrients in the air. Tests carried out by the inventor show that the particle density on a negatively charged membrane according to the invention is three times higher than on a positively charged membrane. Furthermore, it has been shown that the membrane according to the invention will be electronegative when it has a pH of >7 and electropositive when the pH is <7. To ensure a sufficiently high pH, it may be advantageous in the case of some soils to add pH-regulating agents such as salts of alkali metals (sodium, potassium, calcium etc.), plant saps, ash, basic minerals etc. These pH-regulating additives are also favourable in the sense that they are nutrients for plants as well, and are thus environment-friendly and biologically degradable.

In a second aspect of the invention there is provided a method and preparation for increasing the water-bearing effect of the membrane material beyond that of a pure alginate mixture. This method is based on utilising substances from some plants that are naturally found in extremely dry, arid areas of the globe, where these plants procure water even if the rest of the natural surroundings have dried out. A substance of this kind in this connection is dried, crushed amber. The dry amber material is gathered from rocky ground and is crushed or atomised. The powdery mixture is mixed into the membrane mixture using mixing apparatus such as ultra Turax mixers and at a mixture ratio of 10 parts amber to 90 parts alginate. When the mixture is dissolved in water and then applied to a dry sand mass, a sponge-like body is formed which, because of the addition of pulverised amber, has about 30% greater ability to retain water than the original alginate mixture. A similar effect is obtained after having added 10% of finely ground (flour consistency) dried mosses of the type liver moss and riccia fluitans. Without being bound by theory, it is presumed that vegetation of these types in dried, ground state give alginates greater water-bearing effect by increasing the gelling.

In short, the powder mixture according to the invention is characterised in that it comprises only dried and ground marine brown algae with added pigments having sufficiently coarse particle size to allow the pigments to be retained on the top of the soil when the gel soaks down into the soil, and that the powder mixture is at least saturated with electrons by the application of an electronegative ionisation potential. Thus, like the powder mixture in the reference applications, the powder mixture according to this invention is also an electronegative, antioxidising, environment-friendly and biologically degradable mixture of organic materials which can be applied to and mixed into moist soil as dry matter or into dry soil in liquid state, and which then hardens or sets into a degradable membrane on top of and/or at a given depth in the soil. All components of the basic mixture should be electronegative and have an antioxidising effect on the environment, and this is a requirement which provides guidance for the choice of possible pigments.

In view of the relative simple composition of the powder mixture, it is surprising that very small amounts of the powder when mixed in water and sprayed onto a soil can form a durable and long-term effective membrane just beneath the top layer of the soil. Practical tests have been carried out in Kuwait and Egypt which show that even such small amounts as 0.5 g of dry powder per $m^2$ of sand surface established a membrane which increased the retention time of water enough to cause the watering need of the test field to fall by more than 50%. We would point out that this efficiency is so great that it becomes realistic to treat huge areas. An amount of 0.5 g/$m^2$ means a consumption of only 0.5 kg per decare and that half a tonne of the powder is enough to cover 1000 $km^2$. If the aim is just to bind the top soil layer, a long-term effective top membrane has been obtained that is made of amounts of dry matter of as little as about 0.3 g/$m^2$ which effectively binds the top sand layer and prevents sand drift caused by substantial wind load. The desired object of the invention is even obtained with such small amounts as 0.1 g/$m^2$. This shows quite clearly that the powder according to the invention is an unusually economical means of establishing vegetation, cultivating crops and/or stopping erosion and sand drift in desert areas. And since the invention can be used by such a simple method as dissolving it in water and then spraying it across the soil or sand, and since all necessary ingredients in the powder mixture according to the invention are easily processed and inexpensive for the manufacturer to obtain, it is obvious that this invention will be unusually inexpensive for the end user to obtain and use compared with known similar products on the market. Thus, it is possible to reach the goal that even poor farmers should be able to afford to use the invention.

In the same way as for the power mixture presented in the reference applications, it is preferred that this powder mixture should also be biologically degradable and per se serve as nutrition for the plants and that it should be produced from natural, industrial and/or household organic waste substances. This results in an environment-friendly aid/soil-enhancing agent that has little or no harmful effect on the ecosystems in which the invention is used, and which in addition helps to reduce some waste problems. Moreover, the use of waste will make the raw materials very cheap to purchase, some will be free of charge if collected and some will even involve payment to those taking them away, so that the invention represents a very inexpensive antioxidising soil and growth enhancing agent. The fact that the raw materials are inexpensive and that the effect of the powder mixture is strong so that it is exceptionally economical to use, is an important feature of this invention because it is intended to be used also in the poorest areas of the world where purchasing power is very low. This is a property which distinguishes this invention from known, similar solutions, and is also an absolutely necessary condition to help improve the food supply situation in the poorest and most densely populated areas of the world.

And like the powder mixture of the reference applications, the powder mixture according to this invention can have added thereto the same controlled amounts of additives so as to give the resulting film further properties in order to meet one or more needs in addition to the properties of the basic powder. These additional needs and necessary properties are presented in detail in the reference application, and therefore only a key-word summary will be given here.

Possible additives: Binder/reinforcing material, preservative, pH-regulator, antioxidants, nutrients and agents for regulating the electrical conductivity of the membrane etc.

Possible added properties: mechanical functionality (strength, elasticity), liquid permeability, light reflection properties, electrical conductivity, durability/rate of degradation etc., thereby obtaining the possibility of adjusting mechanical quality, temperature, nutrient uptake, of reducing production of near-ground free radicals, water runoff, evaporation rate, combustibility, rate of erosion, and of controlling unwanted germination and growth of weed species etc. in the uppermost layer of the soil. In addition, by a conscious choice of raw materials it is possible to endow the membrane with insect repellent properties. Examples of such additives that have insect repellent properties are lavender sap, balsam pine sap etc.

In brief, the film or membrane according to the invention is a highly flexible soil, growth and environment enhancing means with a wide range of uses.

Although the invention has been developed as a means for converting dry, hot soil into fertile soil, the invention can be used for all areas in which there is a desire to save water and nutrients and to regulate growth conditions for plants, such as in agriculture, horticulture, green areas, sports grounds, roadsides etc, in almost all other climate zones.

DETAILED DESCRIPTION OF THE INVENTION

The invention will now be described in more detail, and examples of preferred embodiments and uses of the invention will be given.

To make the invention readily available and practically useful, it is intended to be put on the market in the form of a dry powder mixture comprising dried and ground marine seaweed and kelp species with at least one pigment in powder form added thereto, and wherein the powder mixture has been treated with UV-light and an electronegative ionisation potential. In use, typically 0.3-2.0 g/m$^2$ of powder mixture is dissolved in 1.0 liters of water or other suitable polar solvent, in order to then be spread across about 1 m$^2$ of soil surface that is to be treated in an appropriate manner. Spraying is an obvious method. The desired effect of the invention has been demonstrated with powder amounts of from 0.1 to 10.0 g/m$^2$. When vigorously stirred in suitable amounts of water, the powder will easily dissolve and form a suitably viscous gel or liquid which will penetrate some way down into the top layer of the soil to which it is applied. After some time, the gel or liquid will harden into a solid membrane, whilst pigment and some of the gel is retained on the top of the soil and will, together with some of the membrane-forming solution, form a solid pigmented surface layer which alters the albedo of the soil in the desired direction. Choice of pigments will determine the colour and thus the albedo that the layer will have, and both type and quantity of pigment can naturally be adapted to the local temperature conditions and soil in which the membrane is intended to be used. Alternatively, the powder mass can be mixed into dry sand in the ratio of 1-5 g powder per 100 g of sand and then water can be added (about 1.0 liters of water), and spread over about 1 m$^2$ of soil surface.

Choice of Raw Materials

It is the alginate in the marine seaweed and kelp species that is the active membrane-forming ingredient of the powder mixture according to this invention. Alginate is a generic term for a family of linear polymers built up of (1→4)-linked β-D-mannuron acid and α-L-guluron acid. Theoretically speaking, therefore, it is possible to produce the powder according to this invention of pure alginate with an added pigment. But because marine brown algae may contain alginate of as much as 40% of the alga's dry weight, it has not been found to be expedient for this invention to extract the alginate in pure form from the alga mass. Practical tests have shown that marine brown algae contain sufficient amounts to form membranes that are more than strong enough, which means that it is less expensive and easier to produce the powder mixture simply by drying and grinding up the brown algae. The other substances in the brown algae will constitute a natural fertiliser, and thus help to promote plant growth. It is therefore preferred to use ground and dried marine brown algae as raw material for this invention.

The polymer sequences of alginate can be described as a block polymer consisting of three different types of blocks: G blocks (homopolymeric guluron acid blocks), M blocks (homopolymeric mannuron acid blocks) and MG blocks (alternately M and G) with a length of two monomeric units or more. The sequence varies from almost purely alternating polymer ( . . . MGMGM . . . ) via random sequences ( . . . MMGMGMMG . . . ) to sequences that consist of pure block polymers ( . . . GMMMMGGGGMMMGGG . . . ). There are distinctive structural differences between the block types. The MG block forms the most flexible chains and is more soluble at a low pH than the two other block types. G blocks form rigid chains, and two G blocks consisting of more than six residues each may be cross-linked with multivalent cations, which results in gelling. G blocks are thus the part of the sequence of the alginate molecule that selectively binds multivalent cations and thus leads to the sol-gel transition. The amount and sequence of the two monomers varies at times greatly between different species of algae, and also between the different parts of the same alga. Harvesting time and growth conditions will also have an effect on the monomer sequence of the alginate. Broadly speaking, a distinction can be made between the stem or stalk of the alga and the leaf tissue. The stem will have a higher proportion of G blocks than the leaf tissue.

An especially suitable and thus preferred brown alga type for this invention is *Laminaria hyperborea*, which grows in large amounts along the west coast of Norway. This brown alga has substantial leafage containing high proportions of β-D-mannuron acid (high proportion of M-blocks), whilst the stem has a relatively high content α-L-guluron acid (high proportion of G blocks). Tests carried out on behalf of the inventor have shown that β-D-mannuron acid imparts flexibility and elasticity to the membrane according the invention, whilst α-L-guluron acid provides mechanical strength and gelling as described above. To be able to offer the user an optimally flexible product, it is of interest to be able to control the gel-forming and water-binding properties in the resulting membrane. When using *Laminaria hyperborea*, this can easily be achieved by processing stalk and leaf tissue separately. The powder from the two alginate types can then be mixed to the desired ratio in order to provide an optimal product for the use in question. The powder mixtures can either be made ready for a number of different uses and put on sale, or the user can be allowed to mix the two alginate fractions himself. In general, it is the case that a high proportion of leaf powder according to the invention will give a relative soft membrane with high water retentivity which will penetrate quite some way into the soil. A high proportion of stalk powder according to the invention will give a relatively rigid membrane of greater mechanical strength, but correspondingly poorer water retentivity, and it will not soak down into the soil so well. In cases where a portion of flour from amber, moss etc. is mixed into the brown alga powder, it is possible, if so desired, to reduce the proportion of powder from the stalk tissue of the alga (reduce the proportion of G blocks in the alginate mass).

Another factor that has an effect on the membrane formation is the alginate concentration. This is due to the gel-forming properties of the alginate. The gelling process can be described in that segments of a linear polymer in solution react with other segments and thus form branched chains. This will increase the molecular weight and thus increase the number of cross-binding sites. As more and more units react, the molecular weight will move towards the infinite. At the so-called gel point, the largest individual molecule will completely fill the vessel in which it finds itself. The mixture will now no longer flow like a polymer solution, but will have properties of a solid substance in equilibrium with its surroundings. This definition of gelling implies that a higher concentration of alginate will lead to a more rapid and more powerful gelling. Tests carried out for the inventor report that the membrane thickness increases at lower concentrations. This is due to the fact that the alginate solution at lower concentrations needs a longer time to cross-link its G blocks. The tests were carried out with a solution of leaf alginate from *Laminaria hyperborea* on sand corresponding to desert sand in Egypt (where full scale tests have been conducted), and at a surface temperature of 35° C. The membrane thickness is reported as 1.9 cm (alginate concentration ½ g/L m2) and 0.8 cm (alginate concentration 2 g/L m2) at 35° C.

A third factor that has an effect on the properties of the finished membrane is binding with multivalent cations, preferably calcium ions. A bivalent cation will lead to a coordinated binding between four g-units on two polymer chains, wherein pairs of g-units are situated next to each other on the same chain. Because of the stereochemistry, the G blocks in question will have a zig-zag formation, and when the two polymer chains are bound together, the chains will have the appearance of the inside of an egg box. The addition of calcium ions will result in an immediate gelling. The gelling is thermostable and irreversible. The addition of controlled amounts of calcium ions to the soil, for example by preparing the soil with a calcium salt prior to the application of a membrane, will cause the alginate solution to quickly form a stable gel. This property can also be used to tailor the properties of the membrane. Since the calcium ions primarily bind to the G blocks, the optimal amount can be calculated in a 1:1 mole ratio between these G blocks and the free calcium ions. This will give a gelling wherein factors such as water retentivity, setting time for the gel and the membrane depth are fully controllable. If this is to be possible, the ratio between the M, MG and G blocks must be known, and the average molecular weight and intrinsic viscosity must also be known. This can be done by NMR analysis and calculations as described below.

The pigments that are to be used in the powder can be selected freely from among all known pigments provided they do not have an electropositive effect (are an oxidant) and provided they are biologically degradable/useful to the plants. The colour of the pigments will of course determine the albedo of the coating, and light pigments should be chosen in cases where it is desirable to lower the temperature in the soil, and dark pigments when it is desirable to increase the temperature. Examples of suitable pigments are presented in detail in the reference applications NO 20031167 and PCT/NO04/00071. All pigments mentioned therein can also be used in this invention. Examples of suitable and preferred fibres are cellulose fibres from ground wood, bark, cardboard, paper, hemp and the like, ground plant fibres from blades of grass, ears of corn, straw, rushes, lichen, moss, peat, roots and the like, and fibres from textiles such as wool, cotton, viscose, silk, linen and the like, and animal fibres such as hair, bristles, crushed feathers and the like.

To increase the degree of reflection of the film or membrane, it is preferable to use one or more of the following materials in dry powder form as pigments: stone, lime, sand, clay, chalk, shell, ground bird feathers and the like, white mineral pigments such as $TiO_2$, white plant dyes and/or white plant fibres such as cotton, bog cotton or algae-based ingredients having light characteristics etc.

To reduce the degree of reflection of the film or membrane, i.e, increase the degree of absorption, it is preferable to use one or more of the following materials in dry powder form as pigments: ash, coal, soot, carbon black, graphite and other forms of elementary carbon, earth pigments such as ochre, bone, shells from animals, shells, fish scales, mineral pigments, plant dyes, plant pigments, algae-based ingredients having dark characteristics etc.

Microalgae may also be used as pigment. These may have a wide range of colours so that they can be used both to increase and to decrease the degree of reflection of the film or membrane.

The amount of pigment added will of course vary depending on the albedo-regulating effect it is desired to obtain and the choice of pigment, but will usually be within 0.1 to 25 g per liter of solution.

Production of the Powder

Leaf and stem tissue from *Laminaria hyperborea* is mechanically separated. Then the leaf tissue and the stem tissue are ground separately in wet or dried state. The grinding and drying process should result in a finely ground dry powder of flour consistency. Any conventional process for grinding marine brown algae can be used providing it does not damage the alginate fraction in the tissue. Typically, 10 grams of fresh brown alga will result in about 3 grams of dried powder.

After the powder has been ground it should be saturated with electrons to at least electrical neutrality by exposing the powder to an electronegative ionisation potential. The grinding and drying process will inevitably mean that electrons are detached from the powder mass, giving the powder an electropositive character. This process must at least be reversed (refill all electron holes) to prevent the membrane from having properties that are the very opposite of the desired properties, but it can advantageously be run so far that the powder mixture is given an excess of electrons. Desired pigments and any other desired additives are then added.

If desirable, routine investigations using NMR can be carried out to determine the composition of the polymer in order to check that the raw material contains the desired proportion of M or G blocks (this varies according to the time of year). The proportion of alginate rich in G blocks and alginate rich in M blocks is then mixed in a controlled manner to give a desired ratio in the finished powder product. Alternatively, the powder can be sold as a G and an M fraction and the customer can mix them himself.

Application of the Membrane

In use, the powder can easily be dissolved in water and sprayed evenly across the area to be treated. Normally, from 0.3 to 10 grams of dry matter per liter of water per $m^2$ will be used, but tests have been carried out in which an adequate effect has been obtained with as little as 0.1 g of dry matter per liter. One liter of liquid should normally be applied to 1 $m^2$ of soil surface.

If desired, seeds can be added to the liquid or the dry matter mixture immediately before the membrane is established. The seeds thus acquire moisture, mechanical stability and lower temperature in the germination period which is usually in the range of three to seven days. The membrane can then be broken down by natural degradation mechanisms and taken up as nutrition in the microbiological cycle.

Powder Mixture Intended for Use in Desert Areas

The problem of establishing vegetation, including plants, in desert areas is often a combination of the fact that the top layer of the sand is loosely bound and thus vulnerable to wind erosion, that the sand contains few nutrients, that the sand has inadequate water retentivity, and that the sand becomes too hot during the day because of intense solar illumination (sand temperatures of more than 100° C. have been measured).

It is obviously necessary to lower the sand temperature during the day quite drastically in desert areas for plants to have optimal conditions. A membrane with a light surface should therefore be laid so that a greater proportion of the sunlight is reflected from the ground. Normally, desert regions with reddish sand have an albedo of around 15%, whilst white desert sand with the sun at its highest point has an albedo of about 25%. Measurements of the surface temperature of such sand surfaces with the sun at its highest point carried out for the inventor showed that the red sand surface with an albedo of 15% had a temperature of 140° C., and white sand with an albedo of 25% had a temperature of 94° C. The white sand had a particle size corresponding to ⅙ of that of the red, so that the absorption area for the sunlight on the white field was less than on the red.

In tropical areas it will therefore be very favourable to give the membrane according to the invention greatest reflection at the time of the day when solar radiation is most intense. Importance has therefore been given to arriving at a mixture with characteristic dynamic reflection which means that the part of the surface membrane which becomes hottest is also the most reflective, and the part that has the lowest temperature is the darkest. This is an important feature for uses of the invention in geographical areas with low night temperature and high day temperature.

According to the invention, this is achieved by using pigments which have a directional reflector surface, and by arranging the reflector surfaces of the pigments in roughly the same plane in such manner that they have maximum reflection effect when the sun is at its highest point. A simple and highly reliable method of achieving this is to use pigments that have a geometry of a fairly flat or elongate character, such as rods, cylinders, discs, plates etc. The flat or elongate character of the geometry of such pigments will mean that they tend to lie down on the top of a soil so that an upward facing long side will tend to be arranged in the horizontal plane. One example of a highly suitable pigment material for this purpose is crushed white bird feathers, both because they give long, rod-shaped or cylindrical pigments which are highly adaptable and because bird feathers are today a waste material and thus a very inexpensive raw material. The pigment effect can be reinforced by adding a fraction of mineral pigments such as $TiO_2$. An alternative is to use temperature-sensitive pigments that are lighter at relatively high temperatures and darker at lower temperatures.

An important factor in this connection is to make the actual gel or basic mixture transparent or at least as light as possible so that the membrane's colour or albedo is determined as far as possible by the added pigments. This can be achieved by bleaching the powder mass resulting from the grinding and drying of the marine seaweed and kelp species before adding the desired pigment or pigments. I.e., the pigments in the marine seaweed or kelp species should be removed from the powder mass. The bleaching of the powder can be done after grinding by adding a conventional bleaching agent and at the same time exposing the mixture to UV light (315-250 nm).

It has been found practical to treat the bleached powder mixture with an electronegative ionisation potential at the same time in order to saturate it with electrons. This is because the ionisation produces ozone which is an effective bleaching agent. The result is a brightly bleached powder which will form an almost transparent membrane, but which on the addition of light pigments will form a light membrane which reduces the albedo of the top sand layer radically. This is a solution to the problem of excessively high sand temperatures. Especially preferred pigments in this case are high-reflecting pigments from crushed bird feathers, optionally mixed with mineral particles. The crushing of the bird feathers will give rod-shaped pigments, and it is preferable that they have a length of up to 1-2 mm, preferably in the range of 0.1 to 0.5 mm. Measurements made by the inventor show that the membrane according to the invention lowers the surface temperature of the soil surface by 2° C. per % reduction of the soil's albedo.

As regards the problem of inadequate water retentivity, this can be solved by using a high proportion of leaf powder because it will form a soft membrane with high water retentivity and will penetrate a relatively long way down into the sand. Thus, the plant roots will have better access to water. A secondary effect of a lowered sand temperature is also that the evaporation rate of water from the sand is lowered correspondingly. This will also help to improve the plants' water supply. The problem of poor access to nutrients will be remedied in that the powder mixture contains about 60% by weight of the remaining substances from the marine brown algae. These substances will function as fertiliser. However, it is conceivable that the sand will require greater fertilisation than that provided by the membrane. In such cases, standard fertiliser can be mixed into the powder provided it does not act as an oxidant (many synthetic fertilisers have such an effect). Suitable fertilisers are presented in detail in the reference applications NO 20031167 and PCT/NO04/00071, and will not be discussed further here.

If the area is heavily subjected to erosion, it may be necessary to increase the proportion of powder from the stem tissue as this gives a membrane with greater mechanical strength and thus soil-binding capacity. The disadvantage is that such a membrane will not penetrate as far down in the ground and will have a poorer capacity for water retention. This problem can be solved by first laying a watertight root zone membrane formed of the leaf powder and then laying a top membrane made of stem powder.

Verification of the Invention

Behind this invention lies more than three years of tests and applied research. This development work has been under the direction of the inventor and carried out at institutions such as the Norwegian Crop Research Institute (Planteforsk), Særheim Research Centre and the Norwegian University of Science and Technology, and in a number of test fields in countries such as Spain, Kuwait, Egypt and the United Arab Emirates.

The test work has shown that the membrane formation and thus the albedo-regulating effect of the finished membrane is dependent upon the local climatic conditions and the nature of the soil. To obtain optimal results it is important that after application of the membrane-forming gel or liquid, it is sufficiently viscous to penetrate some way down into the soil and form a "sponge-like" body which then hardens into a finished membrane. At the same time, the pigments in the gel or liquid should be held back and lie on the top of the "sponge", and the top should be on the top soil layer. As mentioned, the gelling of alginates is highly dependent upon the type of blocks it contains, the concentration of alginates in the solution and the amount of gel-producing substances found naturally in the earth (polyvalent mineral salts). This means that to obtain optimal results, it is necessary to have control of these factors.

For areas exposed to a lot of sun with low water availability, the object of the development work has been to find the optimal powder mixture to obtain a reduction of the water vapour pressure (i.e., the evaporation) on the surface of 40% and a reduction of the seepage of supplied water into the ground water of at least 50%.

Below is a presentation of a number of test results of two membranes according to the invention which achieved this goal (at least 40% reduction of the evaporation and at least 50% reduction of the seepage).

Results for a Membrane According to the First Aspect of the Invention

The first membrane type that has been tested was, according to the first aspect of this invention, a membrane formed solely of dried, ground brown alga with added pigment. Dried, ground leaf and stem tissue from *Laminaria hyperborea* was used in a mixture which gave 75% M blocks and 25% G blocks with added high-reflecting pigment material consisting of crushed bird feathers from poultry mixed with 40 parts by weight of $TiO_2$. The membrane was formed of 1.0 g of ground brown alga powder with 1.0 g of pigment added thereto. The results for temperature and moisture in the ground are given in Table 1.

TABLE 1

Test results for a membrane according to the first aspect of the invention

| | Surface temperature [° C.] | | Water content of the soil [%] | |
|---|---|---|---|---|
| Test area | With membrane | Without membrane | With membrane | Without membrane |
| Kuwait | 17.41 | 33.4 | 21.5 | 13.5 |
| UAE* | 22.0 | 44.2 | 28.5 | 0 |
| Spain | 21 | 28.8 | 31.5 | 16 |
| Egypt 1 | 16 | 42 | 25 | 7 |
| Egypt 2 | 15 | 49 | 25 | 0 |

*United Arab Emirates

In addition, the following effects of the membrane were demonstrated by the tests:

Egypt: Proven ability to draw dew/moisture from the air into the membrane. Proven ability to stop sand drift; wind tunnel tests resulted in a loss of a marginal 0.8 grams of sand after 126 days of testing. Proven ability to increase germination percentage of seeds from 55% to 99%. Proven ability to reduce germination time from 5 to 2.5 days.

Spain: Proven ability to reduce water consumption of grass by more than 50%. Proven ability to increase root density of grass. Proven ability to improve the growth conditions for grass.

Norwegian University of Science and Technology (NTNU) 2003-2004: Proven ability to bind water in the membrane mass. Proven ability to form a membrane in sand mass. Proven ability to form a sub-membrane in a sand mass.

Plant Research Institute, Særheim Research Centre: Proven ability to reduce formation of $O_3$ in the microlayer above the membrane. Proven ability to lower the soil temperature by 5° C. (at Jæren, Norway).

Results for a Membrane According to the Second Aspect of the Invention

The second membrane is according to the second aspect of the invention wherein dried, ground amber is added. The composition of this membrane-forming mass was: alginate mixture of brown alga having 35% M blocks and 65% G blocks with 10% amber flour and 3% mineral high-reflecting pigment material (crushed bird feathers from poultry mixed with 40 parts by weight of $TiO_2$) added thereto.

In this case the test results were:

TABLE 2

Test results for a membrane according to the second aspect of the invention

| | Surface temperature [° C.] | | Water content of the soil [%] | |
|---|---|---|---|---|
| Test area | With membrane | Without membrane | With membrane | Without membrane |
| Kuwait | 15.3 | 33.4 | 28.3 | 13.5 |
| UAE* | 20.0 | 44.2 | 37.1 | 0 |

TABLE 2-continued

Test results for a membrane according to the second aspect of the invention

| | Surface temperature [° C.] | | Water content of the soil [%] | |
|---|---|---|---|---|
| Test area | With membrane | Without membrane | With membrane | Without membrane |
| Spain | 20.0 | 28.8 | 32 | 16 |
| Egypt 1 | 15.4 | 42.0 | 26 | 0 |
| Egypt 2 | 15.0 | 40.0 | 31 | 0 |

*United Arab Emirates

A comparison of the results in Table 2 with those in Table 1 reveals that the membranes have almost the same effect on the lowering of temperature, but that the membrane according to aspect 2 (with added amber powder) increases the water-binding capacity by up to 30%.

It should be noted that even a membrane formed of 1 gram of dried brown alga mass and 1 gram of pigment mass per square meter of sand surface will result in a lowering of the temperature by 15-25° C. and a very marked increase of moisture in the sand of up to a factor of many. In these tests it has been demonstrated that the invention can make a significant contribution to solving the food situation because it manages to convert desert areas into fertile areas in a very simple and highly inexpensive manner.

The invention claimed is:

1. A composition for treating a soil surface and/or a soil mass, comprising a powder mixture, soluble in water or other polar solvent, of alginate and at least one added pigment, wherein the powder mixture is exposed to an E-field having negative polarity so that the material is at least saturated with electrons, and further wherein the powder mixture is adapted such that, when dissolved in water, the preparation will form a gel which upon application to a soil will soak some way down and form an underlying water and nutrient retaining membrane while the pigments are held back and, together with some of the alginate compounds, form an albedo-regulating pigment layer on the surface of the soil.

2. A composition according to claim 1, where the powder mixture is water soluble, and the source of the alginate is dried and ground organic raw material from marine brown algae.

3. A composition according to claim 2, wherein the raw material is leaf tissue from the brown alga *Laminaria hyperborea*.

4. A composition according to claim 2, wherein the raw material is stem tissue from the brown alga *Laminaria hyberborea*.

5. A composition according to claim 2, wherein the preparation comprises controlled proportions of powder made of stem tissue and leaf tissue of the brown alga *Laminaria hyperborean*, the proportions of the tissues being chosen so as to determine the physical characteristics of the resultant membrane.

6. A composition according to claim 5, wherein the proportion of powder made of leaf tissue that is used causes the percentage of M blocks in the alginate mass to be within 20 to 80% by weight of the total alginate mass in the powder mixture.

7. A composition according to any one of claims 1 or 2, wherein the powder mixture is bleached by the addition of bleaching agent and then being exposed to UV light.

8. A composition according to any one of claims 1 or 2, wherein the powder mixture has added thereto dried and ground amber or mosses or combinations thereof.

9. A composition according to claim 8, wherein the moss is selected from the group consisting of: liver moss and riccia fluitans.

10. A composition according to any one of claims 1 or 2, wherein powder mixture has added thereto from 0.1 to 50 grams of pigment.

11. A composition according to claim 10, comprising a pigment that has a geometry of a flat character.

12. A composition according to claim 10, wherein the pigments have a physical shape selected from the group consisting of: rod-shaped, cylindrical, disc shaped and plate-like.

13. A composition according to claim 10, wherein ground bird feathers are used as pigment.

14. A composition according to claim 13, wherein the feathers come from white gallinaceous birds.

15. A composition according to claim 13, wherein particulate $TiO_2$ is added to the ground bird feathers.

16. A composition according to claim 5, wherein the proportion of powder made of leaf tissue that is used causes the percentage of M blocks in the alginate mass to be within 35 to 65% by weight of the total alginate mass in the powder mixture.

17. A composition according to claim 5, wherein the proportion of powder made of leaf tissue that is used causes the percentage of M blocks in the alginate mass to be about 50% by weight of the total alginate mass in the powder mixture.

18. A composition according to any one of claims 1 or 2, wherein powder mixture has added thereto from 0.5 to 25 grams of pigment.

19. A composition according to any one of claims 1 or 2, wherein the powder mixture has added thereto from 1.0 to 10 grams of pigment.

* * * * *